United States Patent
Harnisch et al.

(10) Patent No.: US 9,616,648 B2
(45) Date of Patent: Apr. 11, 2017

(54) PROFILE CARRIERS AND RELATED METHODS

(71) Applicants: TRUMPF Sachsen GmbH, Neukirch (DE); TRUMPF Werkzeugmaschinen GmbH + Co. KG, Ditzingen (DE)

(72) Inventors: Gunter Harnisch, Koenigsbrueck (DE); Carsten Knobel, Sohland (DE); Wilfried Haas, Ditzingen (DE); Matthias Wolfrum, Ditzingen (DE); Tom Wunderlich, Moensheim (DE); Joerg Herbst, Ditzingen (DE); Eckart Schuetze, Dorsten (DE); Martin Schuetze, Soest (DE); Rainer Schuetze, Braunschweig (DE)

(73) Assignees: TRUMPF Sachsen GmbH, Neukirch (DE); TRUMPF Werkzeugmaschinen GmbH + Co. KG, Ditzingen (DE)

( * ) Notice: Subject to any disclaimer, the term of this patent is extended or adjusted under 35 U.S.C. 154(b) by 459 days.

(21) Appl. No.: 14/159,680

(22) Filed: Jan. 21, 2014

(65) Prior Publication Data

US 2014/0202972 A1 Jul. 24, 2014

(30) Foreign Application Priority Data

Jan. 22, 2013 (EP) .................................... 13152183

(51) Int. Cl.
*B23K 26/08* (2014.01)
*B32B 37/14* (2006.01)
(Continued)

(52) U.S. Cl.
CPC ........ *B32B 37/144* (2013.01); *B29C 37/0082* (2013.01); *B66C 23/64* (2013.01);
(Continued)

(58) Field of Classification Search
CPC ... B29C 37/0082; B32B 37/144; B66C 23/64; F02D 41/2467; F02D 41/40;
(Continued)

(56) References Cited

U.S. PATENT DOCUMENTS 4,866,244 A * 9/1989 Grimm .................. B23K 26/16
219/121.63
5,122,398 A * 6/1992 Seiler ...................... B60R 19/03
293/120

(Continued)

FOREIGN PATENT DOCUMENTS

CN 101332569 A 12/2008
DE 19508193 A1 9/1995
(Continued)

*Primary Examiner* — Sang Y Paik
(74) *Attorney, Agent, or Firm* — Fish & Richardson P.C.

(57) ABSTRACT

A profile carrier includes a base profile of metal and a reinforcement member of fiber-reinforced plastic material that reinforces the base profile. The reinforcement member and the base profile are connected to each other by at least one wall-side positive-locking element that is provided on a profile wall of the base profile and that extends in a transverse direction of the profile wall. The at least one wall-side positive-locking element and the reinforcement member engage one inside of the other in the transverse direction of the profile wall with a positive-locking connection between the reinforcement member and the base profile formed substantially parallel to the profile wall.

20 Claims, 8 Drawing Sheets (51) Int. Cl.
*B66C 23/64* (2006.01)
*B29C 37/00* (2006.01)

(52) U.S. Cl.
CPC ........ *Y10T 29/49826* (2015.01); *Y10T 156/10* (2015.01); *Y10T 156/1039* (2015.01)

(58) Field of Classification Search
CPC ........... F02M 2200/07; F02M 2200/50; F02M 51/061; F02M 51/0664; F02M 51/0685; Y10T 156/10; Y10T 156/1039; Y10T 29/49826
USPC ................................................... 219/121.67
See application file for complete search history.

(56) References Cited

U.S. PATENT DOCUMENTS

| | | | | |
|---|---|---|---|---|
| 6,305,136 | B1 * | 10/2001 | Hopton | B29C 44/18 296/146.6 |
| 6,786,233 | B1 | 9/2004 | Anderson et al. | |
| 6,942,910 | B2 * | 9/2005 | Roberts | B29D 22/00 296/208 |
| 7,199,165 | B2 * | 4/2007 | Kassa | C08J 9/0061 521/134 |
| 7,597,382 | B2 * | 10/2009 | Vilcek | B29C 44/18 296/187.02 |
| 2004/0045250 | A1 * | 3/2004 | Takeuchi | B62D 25/20 52/655.1 |
| 2011/0068076 | A1 | 3/2011 | Schmidt et al. | |

FOREIGN PATENT DOCUMENTS

| | | |
|---|---|---|
| DE | 102008013203 A1 | 9/2009 |
| EP | 0968955 B1 | 2/2004 |

\* cited by examiner

PROFILE CARRIERS AND RELATED METHODS

CROSS REFERENCE TO RELATED APPLICATIONS

This application claims priority under 35 U.S.C. §119 to EP application serial number 13 152 183.3 filed on Jan. 22, 2013. The contents of this priority application are hereby incorporated by reference in their entirety.

TECHNICAL FIELD

The present disclosure relates to profile carriers including a base profile of metal and a reinforcement member of fiber-reinforced plastic material which reinforces the base profile. The reinforcement member and the base profile are connected to each other along a profile wall of the base profile.

BACKGROUND

Profile carriers having a base profile of metal constructed as a hollow profile and having reinforcement layers of fiber/plastic compounds serve, for example, as extension arms of construction machines, such as cranes. The metal base profile has a polygonal closed cross-section. Mutually facing wall portions of the profile wall of the base profile are provided in each case with a reinforcement layer at the inner side thereof. In order to produce the connection between the reinforcement layers and the profile wall of the base profile, which connection provides the reinforcement effect of the reinforcement layers, the reinforcement layers are adhesively bonded to the associated wall portion of the profile wall via their plastic material portion. In order to improve the adhesive bonding of the reinforcement layers to the profile wall, the respective wall portions of the profile wall are pre-treated (e.g., degreased and sand-blasted) before the fiber/plastic material compounds forming the reinforcement layers is applied.

SUMMARY

The present disclosure relates to profile carriers having durable rigidity, a carrier structure of a machine tool which is reinforced by such a profile carrier, and methods for producing a profile carrier and a carrier structure of the above-mentioned type. In some embodiments, the carrier structure is a guiding device for a movement unit of a machine tool. In certain embodiments, the carrier structure includes a carrying base structure that extends in a longitudinal direction of the carrier structure (e.g., a guiding device). The carrier structure also includes a profile carrier of the above-mentioned type that is connected to the carrying base structure and that also extends in the longitudinal direction of the carrier structure, thereby stiffening and reinforcing the carrying base structure. Such profile carriers are intended as hybrid semi-finished products that in some embodiments are provided for applications in which the highest possible level of rigidity of a carrying structure is to be combined with an inherent mass that is as low as possible.

In some embodiments, a positive-locking connection is provided between the base profile and the reinforcement member to reinforce the base profile. The positive-locking connection is effective parallel to the profile wall of the metal base profile of the profile carrier. Accordingly, at least one positive-locking element on the profile wall and on the reinforcement member is brought into engagement in the transverse direction of the profile wall. While unevenness may be produced by sand-blasting a profile wall of a base profile, the above-described positive-locking elements are of a macroscopic nature.

In alternative embodiments to the positive-locking connection, other types of connection, for example, an adhesively bonded connection, may also be provided between the base profile and the reinforcement member. The profile wall of the base profile may be chemically and/or physically pre-treated before the connection to the reinforcement member is produced. It is possible to consider, for example, etching of the profile wall, application of a primer to the profile wall, or roughening of the profile wall via sand-blasting or jets of glass beads. The positive-locking connection described herein permanently prevents a relative movement between the base profile and the reinforcement member that is directed parallel to the profile wall and thus ensures that the reinforcement member can permanently reinforce the base profile. In this manner, an inherent mass of such a profile carrier is relatively low, owing to the hybrid structure and the use of fiber-reinforced plastic material which is associated therewith. Compared with structures made exclusively of fiber-reinforced plastic material, the profile carrier described herein has a considerable cost advantage.

The positive-locking connection between the base profile and the reinforcement member, and consequently the reinforcement effect of the reinforcement member of profile carriers, is maintained when the profile carrier is subjected, during its production or during subsequent use, to a processing operation, for example, a thermal processing operation, which would affect the conventional (e.g., adhesive) connections between the base profile and reinforcement member.

The permanent rigidity and the low inherent mass of such profile carriers are advantageously used by the carrier structure (for example, the guiding device) for a movement unit of a machine tool. Such a carrier structure generally requires sufficient rigidity. The guiding device is capable, with sufficient rigidity, of guiding the relevant movement unit in a precise manner. Additionally, the inherent mass of the carrier structure or the guiding device should be as low as possible. A high level of rigidity along with a low inherent mass is particularly significant when a guiding device with the movement unit guided thereon is moved itself, as may be the case, for example, with portal carriers of machine tools.

In order to produce the carrier structure, a carrying base structure of the carrier structure that is generally constructed in a lightweight manner, and a profile carrier which is used in this case as a semi-finished product, are connected to each other via laser welding. The profile carrier stiffens the carrying base structure permanently without excessively increasing the inherent mass thereof. Owing to the selective and spatially delimited introduction of heat into the components which are intended to be connected to each other, laser welding is particularly suitable for the processing of profile carriers which, owing to the plastic material content thereof, have a degree of heat sensitivity. Furthermore, the laser welding process ensures an effective thrust connection between the profile carrier and the base structure of the carrier structure. If the length of the base structure to be reinforced is of a corresponding length, it may be advantageous to compose the base profile of the profile carrier used to reinforce the base structure from multiple profile portions which may be welded to each other. A unitary reinforcement member may extend over the entire length of the base profile.

The positive-locking elements for producing the positive-locking connection between the reinforcement member and the base profile may be constructed in a variety of forms. In some embodiments, at least one wall-side positive-locking element is constructed as a positive-locking projection which protrudes from the profile wall towards the reinforcement member. Alternatively or in addition at least one wall-side positive-locking element on the profile wall is a positive-locking receiving member which is open in the direction towards the reinforcement member.

For many reasons, it is advantageous for at least one wall-side positive-locking element to be formed in the profile wall of the base profile. Such positive-locking elements can be produced via a simple forming process and form an integral base profile component which is consequently securely connected to the remaining profile wall. In certain embodiments, at least one wall-side positive-locking element is connected to the profile wall of the base profile and/or supported on the profile wall of the base profile. For example, at least one wall-side positive-locking element may be welded or screwed to the profile wall of the base profile. A particularly effective positive-locking connection between the reinforcement member and the base profile is produced on multiple (e.g., all) wall portions of the profile wall of the base profile. The wall portions extend at an angle with respect to each other, and a positive-locking connection between the reinforcement member and the base profile is effective parallel to the profile wall.

In embodiments of particularly rigid profile carriers and consequently profile carriers which are particularly suitable for the reinforcement of carrier structures and guiding devices, the base profile of the profile carrier is constructed as a U-shaped profile having three wall portions which extend at an angle with respect to each other. On at least two wall portions (e.g., on both profile legs and on the profile base which connects the two profile legs to each other), the U-shaped profile is connected in each case in a positive-locking manner to the associated reinforcement member by at least one wall-side positive-locking element.

In terms of production technology, such a profile carrier is distinguished in that the inner side of the U-shaped base profile is readily accessible for the introduction of the reinforcement member. In some embodiments, the profile carrier includes a base profile having multiple wall portions which extend at an angle relative to each other and include a profile wall having a closed wall cross-section.

In principle, the reinforcement member, during the production of the positive-locking connection to the base profile, may still be in the unsolidified or in the already-solidified state. However, the processing of the reinforcement member which is still unsolidified affords the advantage that, during the subsequent solidification of the reinforcement member between this and the profile wall of the base profile, there is formed an adhesive connection which is effective in addition to the positive-locking connection.

During the production of profile carriers the base profile and the still non-solidified reinforcement member are placed one on the other on the profile wall of the base member that is provided with the at least one wall-side positive-locking element in such a manner that the at least one wall-side positive-locking element and the reinforcement member engage one in the other in the transverse direction of the profile wall. Accordingly, the profile wall and the reinforcement member which is still unsolidified are to be moved relative to each other in the transverse direction of the profile wall. In order to produce the relative movement, either the base profile or the reinforcement member which is still unsolidified, or both the base profile and the still-unsolidified reinforcement member, can be moved in the transverse direction of the profile wall. If the at least one wall-side positive-locking element and the still-unsolidified reinforcement member engage one in the other in the transverse direction of the profile wall, the reinforcement member merely needs to solidify in order to produce a positive-locking connection between the reinforcement member and the base profile that is effective parallel to the profile wall. The production of a positive-locking connection when the reinforcement member hardens provides an adhesive connection between the reinforcement member and the base profile.

In some embodiments, the profile wall of the base profile is provided with one or more positive-locking elements that form the positive-locking connection between the reinforcement member and the base profile after the reinforcement member has been applied. Such a procedure is recommended, for example, for reinforcing base profiles whose profile wall has a closed wall cross-section. After the reinforcement member has been introduced inside the base profile in the longitudinal direction of the base profile, the positive-locking connection between the reinforcement member and the base profile is produced through the profile wall of the base profile. The reinforcement member may still be unsolidified or already solidified when the at least one positive-locking element is introduced. Example positive-locking elements that may be used include nails, smooth-walled bolts, and screws.

Regardless of the procedure during the production of the positive-locking connection between the reinforcement member which is not yet solidified and the base profile, there is provision in another advantageous variant, for a desired shape to be impressed on the profile carrier with the base profile and the unsolidified reinforcement member until the reinforcement member has solidified. In this manner, it is ensured that the profile carrier has precisely the desired shape after the solidification of the reinforcement member and is, for example, extremely straight. This condition is in particular significant when the profile carrier is connected to other components for later use via laser welding, for example, when producing a carrier structure of a machine tool (e.g., a guiding device) for a movement unit of a machine tool. During laser welding, the gap which is present between the components to be connected to each other and which is intended to be closed by the welding operation may have only a small gap width. Depending on the particular application, it is also possible for the profile carrier to be impressed with a shape other than a linear shape, for example, a defined curvature.

The profile carrier includes a closed hollow profile as a base profile. The positive-locking connection between the profile wall of the base profile and the reinforcement member can be produced on the base profile with a closed wall cross-section or already at a time at which the wall cross-section of the profile wall of the base profile is not yet closed. In the latter case, the reinforcement member can be introduced at a time at which the wall portion on which the reinforcement member must be placed is still readily accessible. After the reinforcement member has been introduced, the profile wall of the base profile closed. In each case, in order to close the profile wall of the base member, the wall portion which is provided with the reinforcement member and the additional wall portion of the profile wall of the base profile are connected to each other via laser welding. In this instance, the selective introduction of heat linked with the laser welding operation into the components to be connected to each other is also advantageous.

Other aspects, features, and advantages will be apparent from the description, the claims, and the drawings.

DETAILED DESCRIPTION

Figure 1:
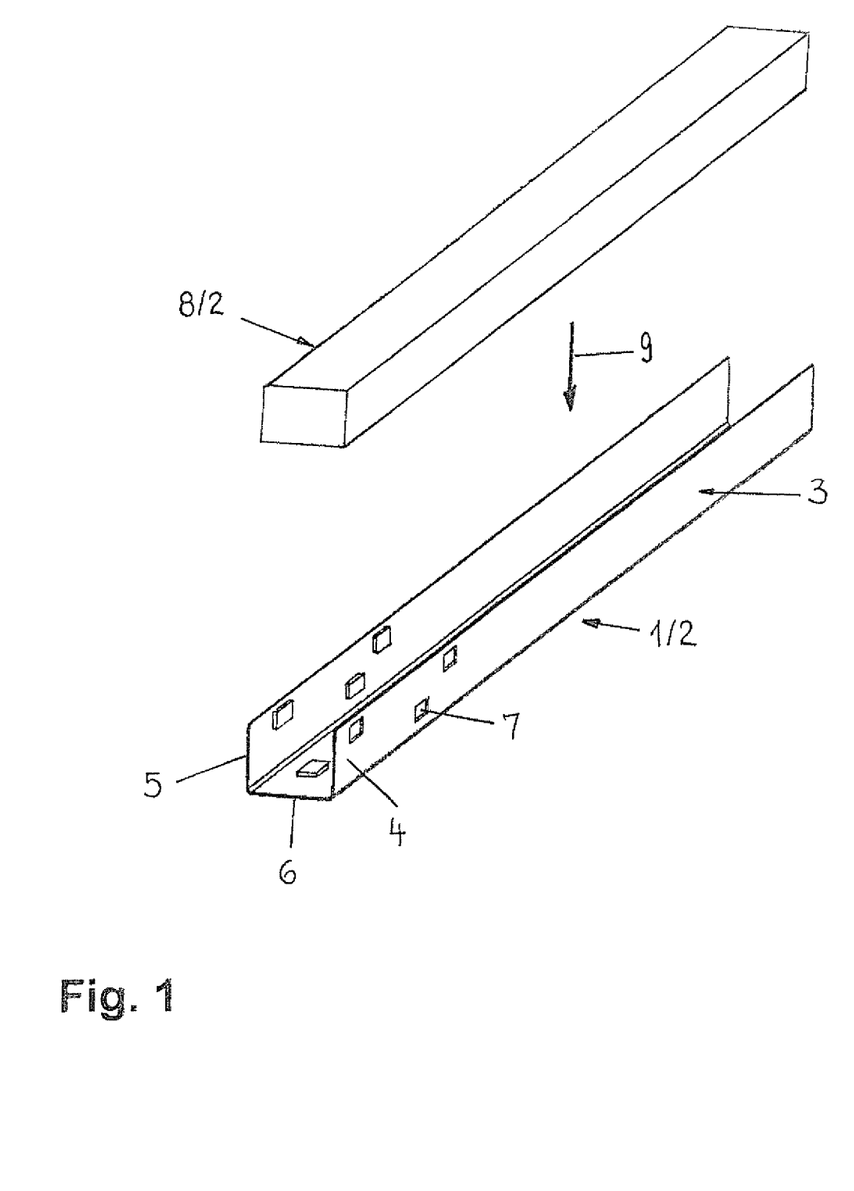
FIGS. 1-3 show a method for producing a profile carrier having a base profile and a reinforcement member which is connected to the base profile in a positive-locking manner.

According to FIG. 1, a metal base profile 1 of a profile carrier 2 is in the form of a U-shaped profile. The metal base profile 1 has a profile wall 3 including three wall portions that are provided by two profile legs 4, 5 and a profile base 6. Both on the profile legs 4, 5 and on the profile base 6, there are provided positive-locking elements 7 which protrude into the base profile inner side. Example materials from which the base profile 1 may be made include steel, aluminium, and titanium.

The positive-locking elements 7 are produced by forming the profile wall 3. At the outer side of the profile wall 3, the positive-locking elements 7 appear as cup-like recesses having a rectangular cross-section, and at the inner side of the profile wall 3, as parallelepipedal positive-locking projections. Other geometries of the positive-locking elements 7 are conceivable. For the sake of simplicity, only some of the positive-locking elements 7, which are distributed over the entire length of the base profile 1, are shown in FIG. 1. In some embodiments, there may also be provided on the base profile 1 outwardly protruding wall projections, which form positive-locking elements (e.g., positive-locking receiving members) which are open towards the inner side of the base profile 1.

A reinforcement member 8, which is arranged in FIG. 1 outside of the base profile 1, is used to reinforce the base profile 1. The reinforcement member 8 is a girder of fiber-reinforced plastic material. In the example illustrated, unidirectional carbon fibers are embedded in the reinforcement member 8 in a plastic resin matrix.

In order to produce the profile carrier 2, the reinforcement member 8 is introduced in the still-unsolidified state from the position above the base profile 1 in the direction of an arrow 9 inside the base profile 1 and placed there with pressure being applied to the inner side of the profile wall 3. Owing to the application of pressure, the positive-locking elements 7 at the inner side of the profile-members 4, 5 and the profile base 6 are introduced into the still soft material of the reinforcement member 8. Over the entire contact face, the reinforcement member 8 abuts the profile wall 3 in a tight manner.

Figure 2:
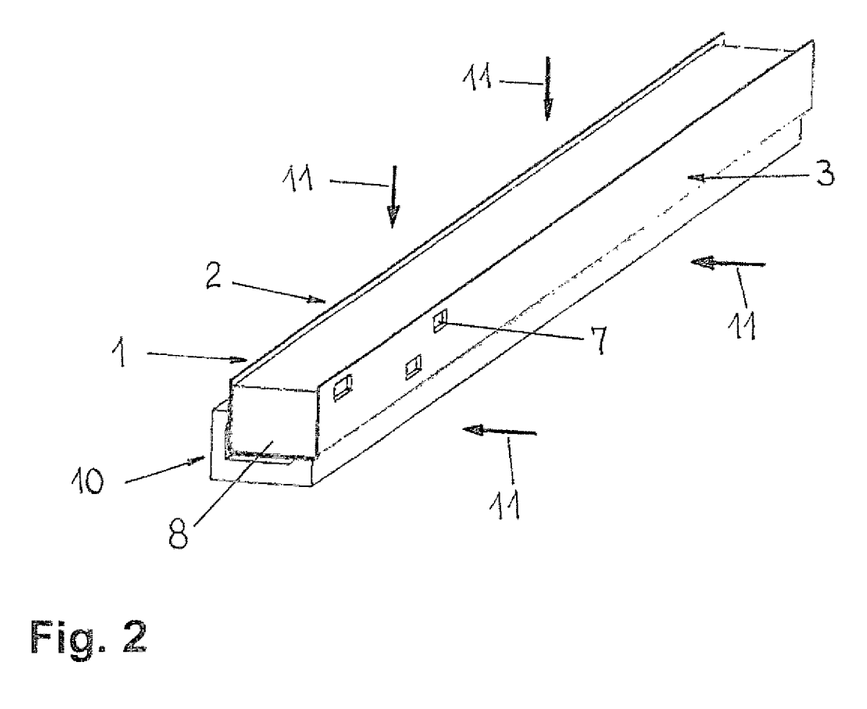

As shown in FIG. 2, with the reinforcement member 8 which is received therein and which is still in an unsolidified state, the base profile 1 is arranged on a straightening device 10. On the straightening device 10, the unit including the base profile 1 and the reinforcement member 8 is clamped with a linear extension with a clamping device, which is indicated with arrows 11, until the reinforcement member 8 has hardened and is thereby solidified.

If necessary, in place of the straightening device 10, a device may also be used which impresses on the unit including the base profile 1 and the still-unsolidified reinforcement member 8 a shape which is other than a straight shape. Shapes which are other than straight may include, for example, a curvature having a large curvature radius. If an originally slightly curved profile carrier is assembled at the installation location thereof with a linear extension, the originally slightly curved shape of the profile carrier affords a simple possibility for producing pretensioning on the assembled profile carrier. The originally slightly curved shape of the profile carrier may also ensure that the profile carrier at the installation location thereof is deformed under load in such a manner that it extends linearly and can then, for example, guide a movement unit which loads the profile carrier in a linear manner.

After the reinforcement member 8 has been solidified, the wall-side positive-locking elements 7 of the profile wall 3 ensure, according to their engagement in the solidified reinforcement member 8, a positive-locking connection between the base profile 1 and the reinforcement member 8 that is effective parallel to the profile wall 3. In addition, after the hardening of the reinforcement member 8, the profile wall 3 and the reinforcement member 8 are adhesively bonded to each other at the contact face thereof. Owing to the clamping on the straightening device 10, the profile carrier 2 is optimally straight after the reinforcement member 8 has hardened. Alternatively to the reinforcement member 8, which fills the cross-section of the base profile 1 only partially, there may also be provided a reinforcement member which completely fills the base profile cross-section.

Figure 3:
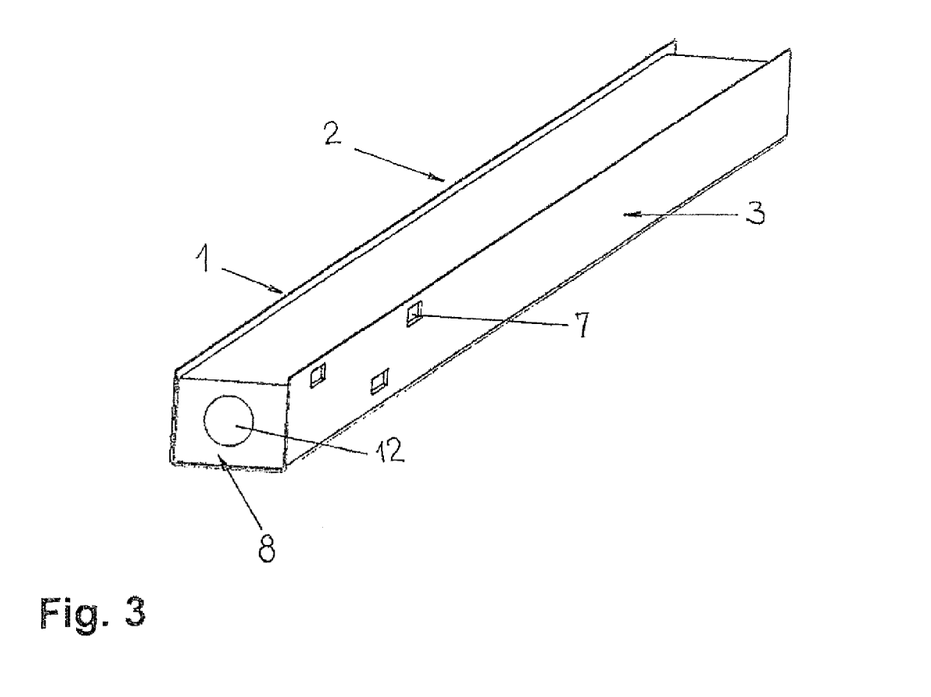

FIG. 3 shows an alternative for producing the positive-locking connection between the reinforcement member 8 and the base profile 1 of the profile carrier 2 that differs from the procedures described above with respect to FIGS. 1 and 2. The reinforcement member 8 according to FIG. 3 has a resiliently compressible core 12 which extends inside the reinforcement member 8 over the entire length thereof. The fiber-reinforced plastic material of the reinforcement member 8 is applied to the core 12. As long as the material of the reinforcement member 8 is in the unsolidified state, the reinforcement member 8 can be compressed to a cross-section size which is smaller than the cross-section of the inner space of the base profile 1. With a cross-section which is reduced in this manner, the reinforcement member 8 is placed in the base profile 1. Subsequently, the core 12 of the reinforcement member expands owing to the resilience thereof. The reinforcement member 8 is thereby pressed against the inner side of the profile wall 3. There is thereby produced close contact between the reinforcement member 8 and the profile wall 3, and the positive-locking elements 7 on the profile wall 3 are introduced into the still-unsolidified fiber-reinforced plastics material of the reinforcement member 8. The unit including the base profile 1 and the still-unsolidified reinforcement member 8 produced in this manner is also clamped on the straightening device 10 until the reinforcement member 8 has been solidified.

Figure 4:
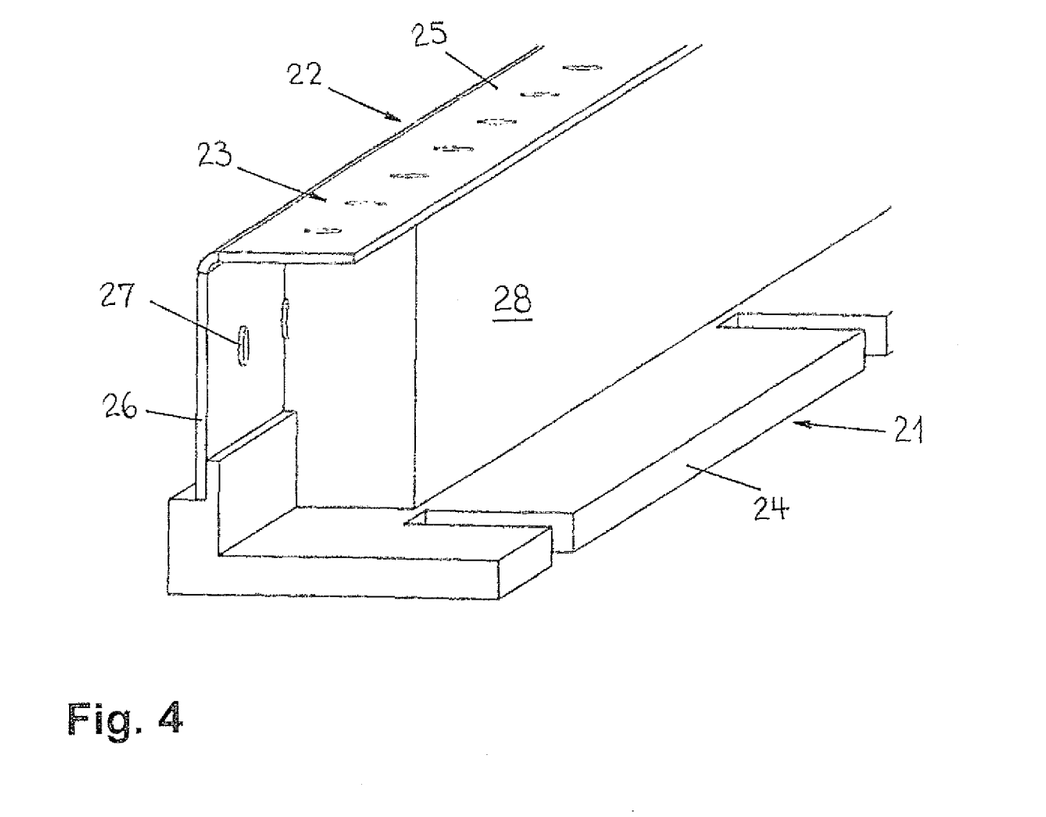
FIG. 4 shows a profile carrier which is produced in accordance with the method according to FIGS. 1-3.

FIG. 4 shows a profile carrier 22 that has also been produced according to the method described with reference to FIGS. 1 and 2. Inside a base profile 21, which is constructed as a U-shaped profile, and which has wall portions that are provided by profile legs 24, 25 and a profile base 26, a reinforcement member 28 of fiber-reinforced plastic material is arranged. The solidified reinforcement member 28 is connected to a profile wall 23 of the base profile 21 in a positive-locking manner and further adhesively bonded. The positive-locking connection is provided by positive-locking elements 27 which have been formed therein by acting on the profile wall 23 from the outer side. The positive-locking elements 27 appear on the outer side of the base profile 21 as cup-like recesses having a circular cross-section and on the inner side of the profile wall 23 as wart-like cylindrical positive-locking projections. The profile carrier 22 is also clamped on the straightening device 10 during the solidification of the reinforcement member 28 and consequently has optimal straightness.

Figure 5:
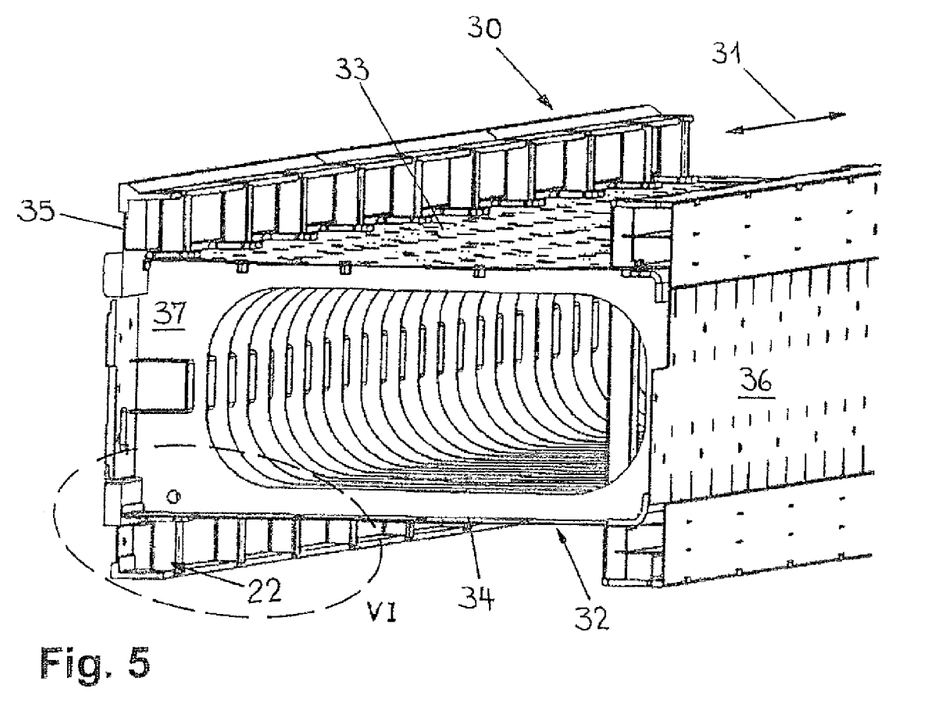
FIG. 5 shows the profile carrier according to FIG. 4 as part of a carrier structure which is constructed as a guiding device for a movement unit of a machine tool.
Figure 6:
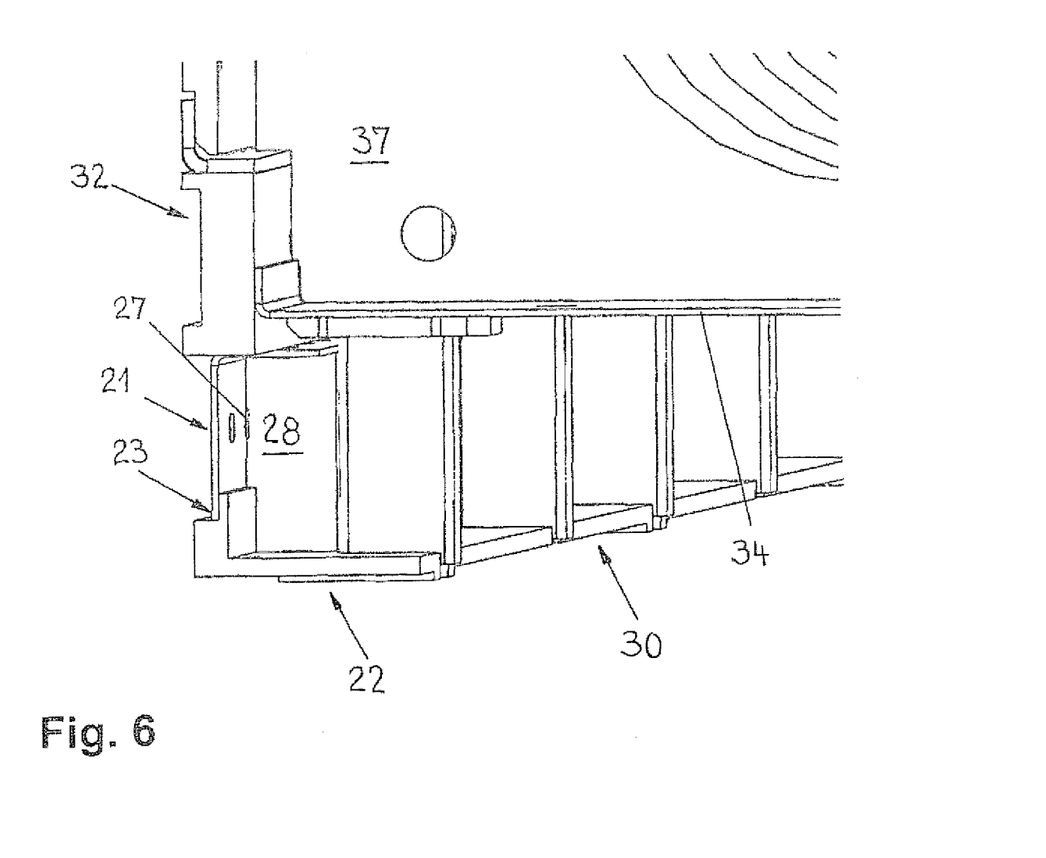
FIG. 6 shows an enlarged view of the detail VI of FIG. 5.

FIGS. 5 and 6 show the profile carrier 22 as part of a guiding device 30 which is provided as a carrier structure of a machine tool. The guiding device 30 is a portal transverse carrier of a flat bed laser machine for cutting sheet metal. In a longitudinal direction illustrated by a double-headed arrow 31, the guiding device 30 guides a laser cutting head (which is not shown) during its movements during sheet metal processing operations.

The guiding device 30 has a case-like base structure 32 which is constructed as a lightweight welded construction. An upper covering metal sheet 33, a lower covering metal sheet 34, a front side metal sheet 35, and a rear side metal sheet 36 are connected to each other to form a welded construction which has a rectangular cross-section and are reinforced at the inner side thereof by stiffening plates 37.

In order to increase the stiffness of the case-like base structure 32, the correspondingly cut profile carrier 22 is placed on the lower covering metal sheet 34 at the corner of the base structure 32 formed by the front side metal sheet 35 and the lower covering metal sheet 34 and connected over the entire length thereof to the base structure 32 by laser welding. Owing to the arrangement at a corner of the base structure 32, a particularly good stiffening effect can be achieved with the profile carrier 22.

For joining via laser welding, the profile carrier 22 is particularly suitable since, owing to the straightness thereof, there is produced before the production of the weld connection between the profile carrier 22 and the base structure 32 a partition gap having a small gap width, as is needed for laser welding. Since, during laser welding, heat is introduced into the components to be connected to each other in only a spatially narrowly delimited region, the reinforcement member 28, in particular the connection thereof to the base profile 21 of the profile carrier 22, is not affected by the welding operation. Consequently, the profile carrier 22 can permanently have a stiffening effect even after welding to the base structure 32 of the guiding device 30 without any limitation.

Figure 7:
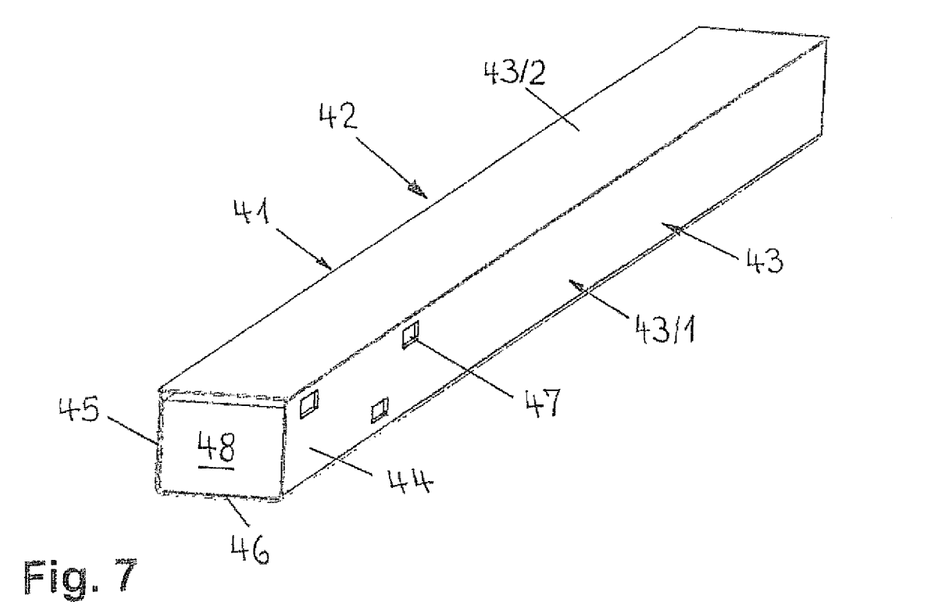
FIGS. 7-8 show other embodiments of a profile carrier having a base profile and a reinforcement member which is connected to the base profile in a positive-locking manner.

FIG. 7 shows another embodiment of a profile carrier. A profile carrier 42 differs from the profile carrier 2 according to FIGS. 1 and 2 in that a profile wall 43 of a base profile 41 has a closed wall cross-section. When the profile carrier 42 is produced, the procedure as in the production of the profile carrier 2 is first carried out. A still-unsolidified reinforcement member 48 is placed inside a U-shaped wall portion 43/1 of the profile wall 43 of the base profile 41. The U-shaped wall portion 43/1 is provided with positive-locking elements 47 and includes wall portions provided by profile legs 44, 45 and a profile base 46. After the hardening and the straightening of the profile carrier 42, while still open in an upward direction, a flat wall portion 43/2 is then connected to the wall portion 43/1 of the profile wall 43 via laser welding.

The positive-locking elements 47, which correspond to the positive-locking elements 7 according to FIGS. 1 and 2 in terms of their construction, ensure that a positive-locking connection between the reinforcement member 48 and the base profile 41 is effective parallel to the profile wall 43. Furthermore, the reinforcement member 48 is adhesively bonded to the base profile 41.

Figure 8:
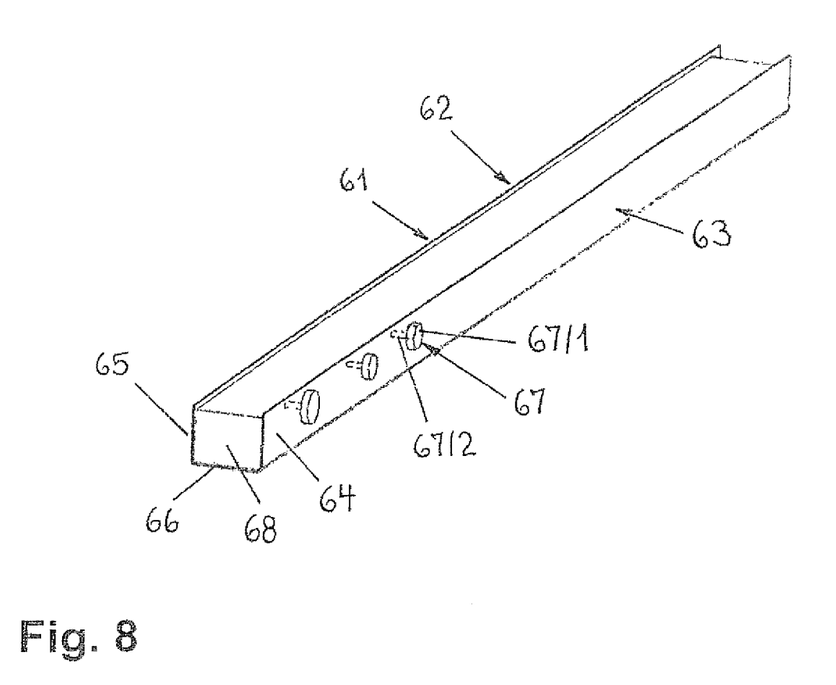

According to FIG. 8, a profile carrier 62 has a base profile 61 including a profile wall 63 which has a U-shaped cross-section. The profile wall 63 has wall portions that are provided by profile legs 64, 65 and a profile base 66. The profile carrier 62 further includes a reinforcement member 68 of fiber-reinforced plastic material which is embedded in the inner side of the base profile 61. Positive-locking elements 67 on the profile wall 63 of the base profile 61, in contrast to the positive-locking elements 7, 27, 47 according to FIGS. 1 to 7, are not produced by shaping the profile wall 63 but are instead provided as additional components (e.g., bolts).

Bolt heads 67/1 of the positive-locking elements 67, which abut the outer side of the profile wall 63 of the base profile 61, can be seen in FIG. 8. Bolt shafts 67/2 of the positive-locking elements 67 indicated with broken lines in FIG. 8 extend through openings in the profile wall 63 and engage the reinforcement member 68.

Also during the production of the profile carrier 62, the reinforcement member 68 is placed into the base profile 61 in the non-solidified state. However, the base profile 61 or the profile wall 63 thereof is at this time not yet provided with the positive-locking elements 67. The positive-locking elements 67 are instead driven into the still-unsolidified material of the reinforcement member 68 after the reinforcement member 68 is placed, through the openings provided for this purpose, in the profile wall 63. Owing to the engagement of the bolt shafts 67/2 of the positive-locking elements 67 in the hardened reinforcement member 68 which is adhesively bonded to the base profile 61, a positive-locking connection is produced between the reinforcement member 68 and the base profile 61 that is effective parallel to the profile wall 63.

Alternatively, it is possible to produce a positive-locking connection between the base profile 61 and the reinforcement member 68 that is effective parallel to the profile wall 63 without bolt-like positive-locking elements 67, by using through-openings in the profile wall 63. If the still-unsolidified material of the reinforcement member 68 flows from the inner side of the base profile 61 into such through-openings and subsequently hardens, the reinforcement member 68 is readily secured to the profile wall 63 in a non-displaceable manner via the engagement into the through-openings.

What is claimed is:

1. A carrier structure of a machine tool, the carrier structure forming a guiding device for a movement unit of the machine tool and comprising:

a carrying base structure that extends in a longitudinal direction of the carrier structure; and a profile carrier that is connected to the carrying base structure via laser welding, that extends in the longitudinal direction of the carrier structure, and that stiffens the carrying base structure, the profile carrier comprising:

a base profile of metal; and a reinforcement member of a fiber-reinforced plastic material that reinforces the base profile, wherein the reinforcement member and the base profile are connected to each other along a profile wall of the base profile, wherein the reinforcement member and the base profile are connected to each other by at least one wall-side positive-locking element that is provided on the profile wall of the base profile and that extends in a transverse direction of the profile wall, and wherein the at least one wall-side positive-locking element and the fiber-reinforced plastic material of the reinforcement member engage one inside of the other in the transverse direction of the profile wall with a positive-locking connection between the fiber-reinforced plastic material of the reinforcement member and the base profile formed, the positive-locking connection being effective substantially parallel to the profile wall.

2. The carrier structure according to claim 1, wherein the at least one wall-side positive-locking element is constructed as a positive-locking projection which protrudes from the profile wall towards the reinforcement member.

3. The carrier structure according to claim 1, wherein the at least one wall-side positive-locking element is constructed as a positive-locking receiving member of the profile wall that is open in a direction towards the reinforcement member.

4. The carrier structure according to claim 1, wherein the at least one wall-side positive-locking element is provided by the profile wall of the base profile.

5. The carrier structure according to claim 1, wherein the at least one wall-side positive-locking element is connected to the profile wall of the base profile and/or supported on the profile wall of the base profile.

6. The carrier structure according to claim 1,
wherein the profile wall of the base profile comprises a plurality of wall portions that extend at an angle relative to each other,
wherein at least one wall-side positive-locking element is provided on two or more of the plurality of wall portions, and
wherein the fiber-reinforced material of the reinforcement member and wall-side positive-locking elements on two or more of the plurality of wall portions engage one inside of the other in the transverse direction of the profile wall, the positive-locking connection between the fiber-reinforced material of the reinforcement member and the base profile thus being formed.

7. The carrier structure according to claim 6,
wherein the base profile is constructed as a U-shaped profile having a profile wall that comprises three wall portions that extend at an angle relative to each other,
wherein at least one wall-side positive-locking element is provided on two or more of the plurality of wall portions, and wherein the fiber-reinforced material of the reinforcement member and wall-side positive-locking elements on at least two of the plurality of wall portions engage one inside of the other in the transverse direction of the profile wall, the positive-locking connection between the fiber-reinforced material of the reinforcement member and the base profile thus being formed.

8. The carrier structure according to claim 6, wherein the profile wall of the base profile has a closed wall cross-section.

9. The carrier structure according to claim 1, wherein the fiber-reinforced plastic material comprises a plurality of unidirectional carbon fibers.

10. The carrier structure according to claim 1, wherein the profile wall of the base profile is chemically pre-treated such that the profile wall of the base profile forms an adhesive bond with the fiber-reinforced plastic material of the reinforcement member.

11. The carrier structure according to claim 1, wherein the profile wall of the base profile is physically pre-treated such that the profile wall of the base profile forms an adhesive bond with the fiber-reinforced plastic material of the reinforcement member.

12. A method for producing a carrier structure of a machine tool, the carrier structure forming a guiding device for a movement unit of the machine tool, the method for producing the carrier structure comprising:
a method for producing a profile carrier, comprising:
placing a base profile of metal in contact with a fiber-reinforced plastic material of a reinforcement member along a profile wall of the base profile, and
engaging at least one wall-side positive-locking element provided on the profile wall of the base profile and extending in a transverse direction of the profile wall with the fiber-reinforced plastic material of the reinforcement member in the transverse direction of the profile wall such that a positive-locking connection between the fiber-reinforced plastic material of the reinforcement member and the base profile is formed, the positive-locking connection being effective substantially parallel to the profile wall;
the method for producing the carrier structure further comprising connecting the profile carrier via laser welding to a carrying base structure of the carrier structure such that the carrying base structure and the profile carrier connected to the carrying base structure extend in a longitudinal direction of the carrier structure and such that the profile carrier, connected to the carrying base structure, stiffens the carrying base structure.

13. The method according to claim 12, further comprising engaging the at least one wall-side positive-locking element with the fiber-reinforced plastic material of the reinforcement member while the reinforcement member is in an unsolidified state.

14. The method according to claim 12, further comprising:
engaging the at least one wall-side positive-locking element with the fiber-reinforced plastic material of the reinforcement member by introducing the at least one wall-side positive-locking element through the profile wall in the transverse direction of the profile wall from a side of the profile wall that is remote from the reinforcement member; and
supporting the at least one positive-locking element on the profile wall in a direction that extends substantially parallel to the profile wall.

15. The method according to claim 12, further comprising impressing a desired shape on the profile carrier including the base profile and the fiber-reinforced plastic material of the reinforcement member in an unsolidified state until the fiber-reinforced plastic material of the reinforcement member solidifies.

16. The method according to claim 12 wherein the at least one wall-side positive-locking element is provided on a wall portion of the profile wall of the base profile, the wall portion at least partially supporting the fiber-reinforced plastic material of the reinforcement member.

17. The method according to claim 16, further comprising connecting at least one additional wall portion to the wall portion at least partially supporting the fiber-reinforced plastic material of the reinforcement member via laser welding to produce the profile wall.

18. The method according to claim 12, wherein the fiber-reinforced plastic material comprises a plurality of unidirectional carbon fibers.

19. The method according to claim 12, further comprising chemically pre-treating the profile wall of the base profile such that the profile wall forms an adhesive bond with the fiber-reinforced plastic material of the reinforcement member.

20. The method according to claim 12, further comprising physically pre-treating the profile wall of the base profile such that the profile wall forms an adhesive bond with the fiber-reinforced plastic material of the reinforcement member.

* * * * *